US010661686B2

(12) United States Patent
Denis et al.

(10) Patent No.: US 10,661,686 B2
(45) Date of Patent: May 26, 2020

(54) DEVICE FOR TILTING THE BACKREST OF A VEHICLE SEAT AND METHOD FOR MOUNTING SUCH A TILTING DEVICE

(71) Applicant: Faurecia Sièges d'Automobile, Nanterre (FR)

(72) Inventors: Bernard Denis, Itteville (FR); David Ventre, Velizy-Villacoublay (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 9 days.

(21) Appl. No.: 16/031,913

(22) Filed: Jul. 10, 2018

(65) Prior Publication Data
US 2019/0016238 A1    Jan. 17, 2019

(30) Foreign Application Priority Data

Jul. 11, 2017 (FR) ...................... 17 56585

(51) Int. Cl.
*B60N 2/20* (2006.01)
*B60N 2/22* (2006.01)

(52) U.S. Cl.
CPC ............ *B60N 2/224* (2013.01); *B60N 2/22* (2013.01); *B60N 2/20* (2013.01); *B60N 2/2236* (2013.01)

(58) Field of Classification Search
CPC ............................................. B60N 2/20–2258
USPC .................................. 297/353–383
See application file for complete search history.

(56) References Cited

U.S. PATENT DOCUMENTS

| 3,562,851 | A | 2/1971 | Koller | |
|---|---|---|---|---|
| 4,732,425 | A | 3/1988 | Terada et al. | |
| 5,813,724 | A | 9/1998 | Matsuura et al. | |
| 6,014,806 | A | 1/2000 | Ohya | |
| 7,093,901 | B2* | 8/2006 | Yamada | B60N 2/22 297/354.12 |
| 7,093,902 | B2* | 8/2006 | Lehmann | B60N 2/22 297/361.1 |
| 7,506,933 | B2* | 3/2009 | Yamada | B60N 2/22 297/364 |
| 9,108,541 | B2* | 8/2015 | Assmann | B60N 2/20 |
| 9,511,693 | B2* | 12/2016 | Nakagawa | B60N 2/6009 |
| 10,065,537 | B2* | 9/2018 | Noguchi | B60N 2/20 |
| 10,071,656 | B2* | 9/2018 | Wetzig | B60N 2/20 |
| 2010/0244530 | A1* | 9/2010 | Kitano | B60N 2/20 297/362 |
| 2012/0175931 | A1* | 7/2012 | Matsui | B60N 2/2356 297/354.12 |
| 2016/0046211 | A1* | 2/2016 | Assmann | B60N 2/2356 297/361.1 |
| 2018/0194251 | A1* | 7/2018 | Kreuels | B60N 2/20 |
| 2018/0213936 | A1* | 8/2018 | Sasaki | B60N 2/2227 |

FOREIGN PATENT DOCUMENTS

EP    0749865 A2    12/1996

OTHER PUBLICATIONS

International Search Report for French application No. FR 17 56585, dated Mar. 7, 2018, 2 pages.

\* cited by examiner

*Primary Examiner* — Syed A Islam
(74) *Attorney, Agent, or Firm* — Reising Ethington P.C.

(57) ABSTRACT

A device for tilting the backrest of a vehicle seat and a method for mounting the device. The device includes a backrest hinge and a handle element fixed to the backrest hinge. The handle element is formed of a metallic material.

13 Claims, 5 Drawing Sheets

DEVICE FOR TILTING THE BACKREST OF A VEHICLE SEAT AND METHOD FOR MOUNTING SUCH A TILTING DEVICE

TECHNICAL FIELD

The present invention relates to a device for tilting the backrest of a vehicle seat.

BACKGROUND

In the automotive field, it is known to provide the seat of a vehicle, in particular of a motor vehicle, with a device for tilting the backrest. More precisely, the seat comprising a backrest and a seating part, the device for tilting the backrest makes it possible to adjust the tilt angle of the backrest with respect to the seating part. A handle attached to the backrest hinge allows the user to adjust the backrest to the position that suits him best.

For this purpose, it is known to have disk-type tilting devices that are selectively actuated between a locked state and an unlocked state in order to pivotably adjust the backrest between a plurality of tilted seating positions. The position is selected from various tilt positions and, if appropriate, a forward folded position.

However, in known devices, the handle element is made of a plastic material, which makes it fragile. In addition, the plastic material can deteriorate over time, rendering the handle element inoperative.

SUMMARY

An object of the present invention is to provide a device for a vehicle seat which does not have at least some of the disadvantages of known devices of the prior art.

This object of the invention may be achieved by means of a device for tilting the backrest of a vehicle seat, comprising a backrest hinge and a handle element fixed to the backrest hinge, characterized in that the handle element comprises a metallic material.

Thus, advantageously, the handle element is more resistant and deteriorates less rapidly over time than a conventional handle in plastic material. The device according to the invention is thus more robust than the known devices of the prior art.

In different embodiments of the invention, one or more of the following provisions may possibly also be used:

- The device further comprises a spacer element and a lock element, the spacer element being located between the backrest hinge and the handle element, and the lock element being located over the handle element.
- The backrest hinge comprises a central rod, and the central rod passes through a central opening provided respectively on the handle element, on the spacer element and on the lock element.
- The central rod has an end provided with a locking member engaging with the central opening provided on the lock element.
- The spacer element is provided with elastic tongues which engage with housings provided in the lock element to hold the handle element on the backrest hinge.
- The handle element comprises windows through which the elastic tongues pass.
- The spacer element is provided with an alignment pin and the handle element and the lock element each comprise an alignment hole receiving the alignment pin.
- The spacer element comprises a plastic material.
- The lock element comprises a plastic material.
- The handle element is made entirely of metallic material.
- The handle element comprises a central plate and a handle that extends from the central plate.
- The handle element has a central opening and the central opening is rectangular.

According to another aspect, the invention also relates to a method for mounting a device for tilting the backrest of a vehicle seat as mentioned above, wherein the spacer element is arranged on the central rod, then the handle element is arranged on the central rod, and then the lock element is arranged on the central rod. According to one embodiment, the spacer element can be attached to the lock element by snap-fitting.

BRIEF DESCRIPTION OF THE DRAWINGS

Other features and advantages of the invention will become apparent from the following description of one of its embodiments, given by way of non-limiting example, with reference to the accompanying drawings. In the different figures, the same references designate identical or similar elements.

In the drawings.

DETAILED DESCRIPTION

Figure 1:
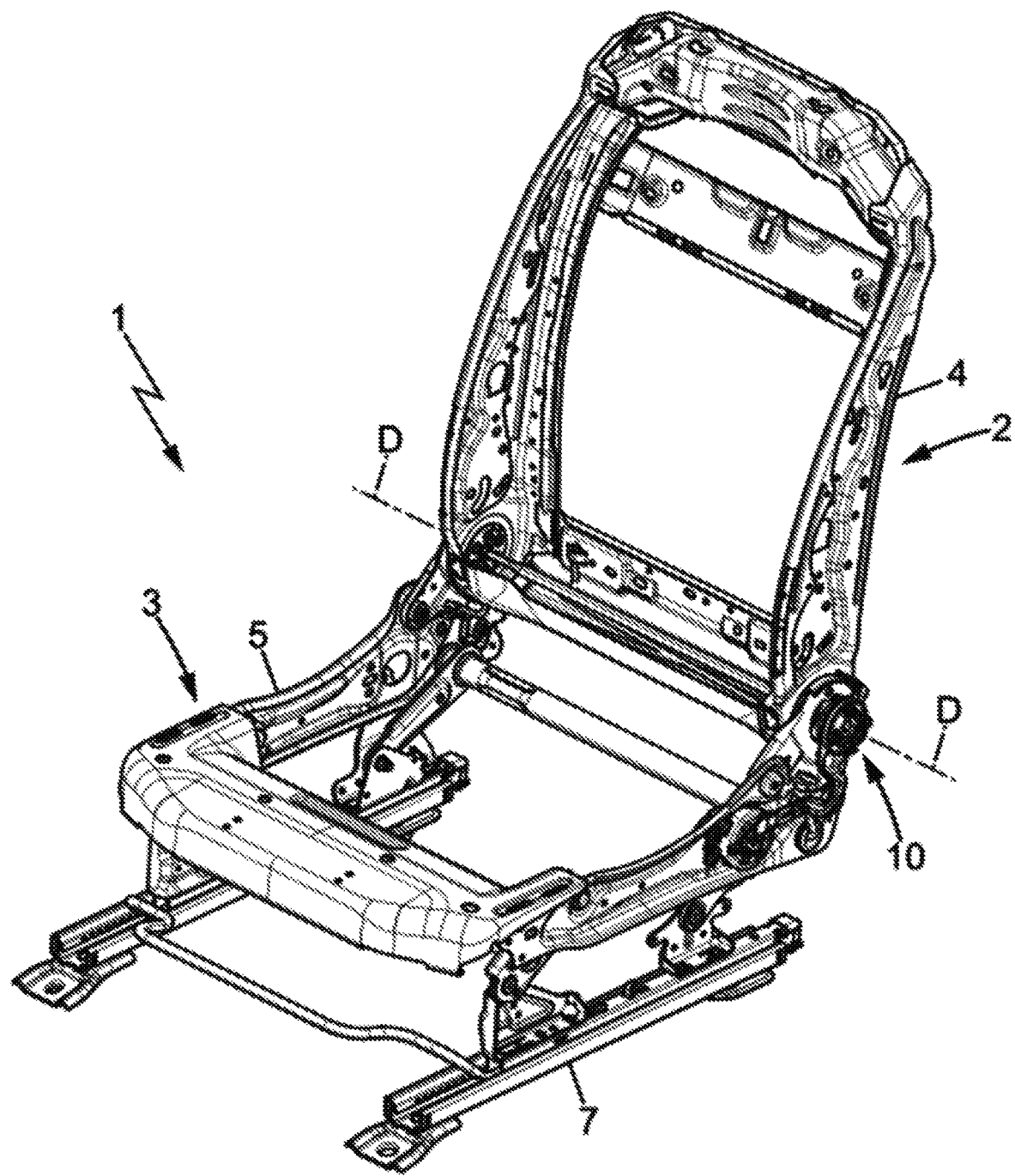
FIG. 1 is a schematic partial perspective view of a motor vehicle seat provided with a device according to an embodiment of the invention.

FIG. 1 partially illustrates a motor vehicle seat 1 according to the invention. The seat 1 has a backrest 2 and a seating part 3. The backrest 2 comprises a backrest frame 4. The seating part 3 comprises a seating part frame 5. The backrest frame 4 is mounted on the seating part frame 5 in a connection 6 pivoting about an axis D. The seating part frame 5 can itself be mounted on the floor of the motor vehicle (not shown), for example via rails 7. According to at least some embodiments of the invention, the device 10 for tilting the backrest of a vehicle seat 1 can be provided in a known manner at the pivoting connection 6.

Figure 2:
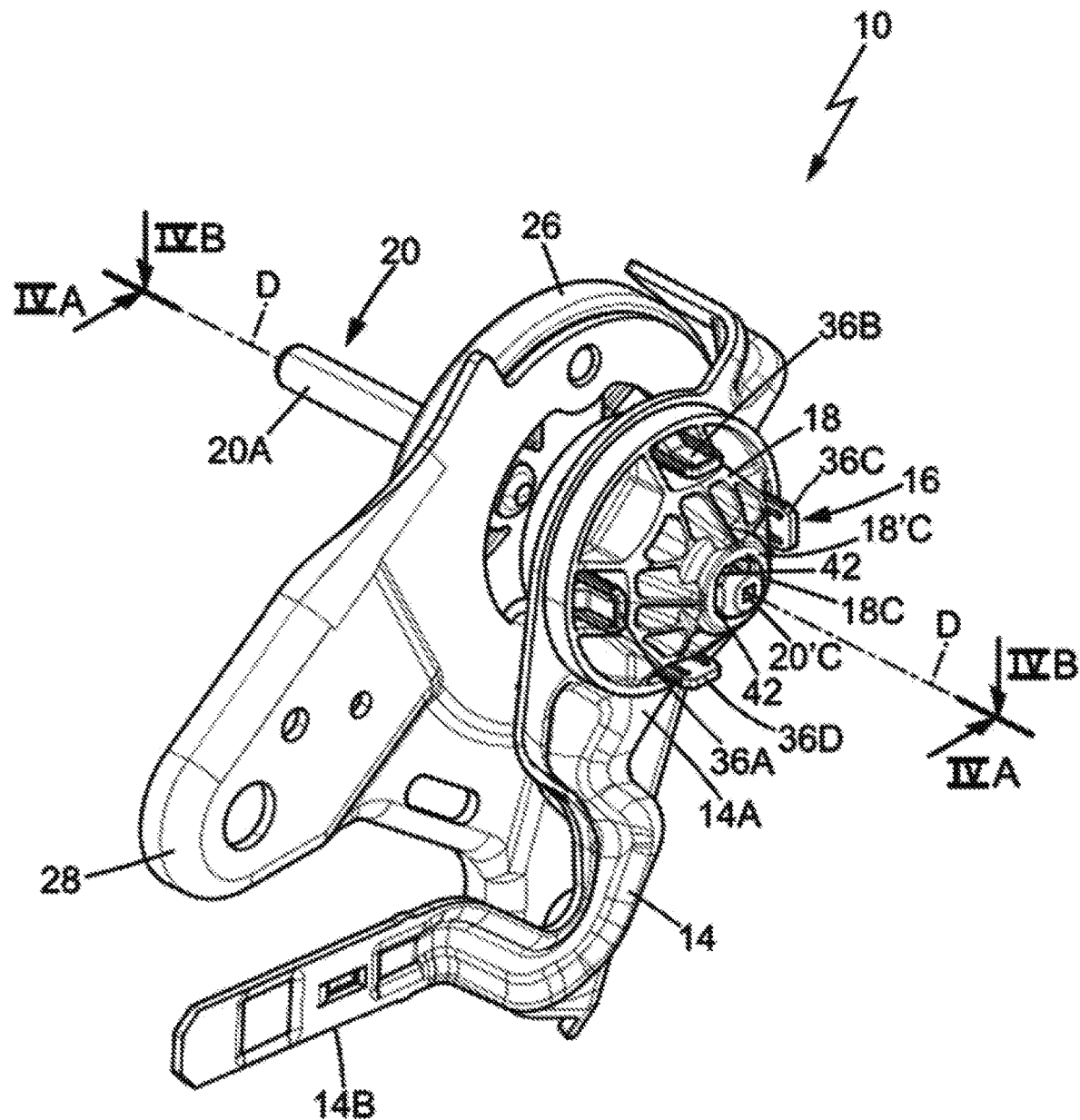
FIG. 2 is a detailed perspective view of the device in FIG. 1.

As illustrated in FIG. 2, the device 10 comprises a backrest hinge 12 and a handle 14 attached to the backrest hinge 12.

In order to avoid having to fix the handle element 14 by welding to the backrest tilting device 10, the device 10 may further comprise a spacer element 16 and a lock element 18. Thus, the handle element 14 can be attached to the backrest hinge 12 not by welding, but by engagement of the spacer element 16 and the lock element 18, as described in more detail below. The spacer element 16 may be located between the backrest hinge 12 and the handle element 14, and the lock element 18 may be located over the handle element 14.

Figure 4A:
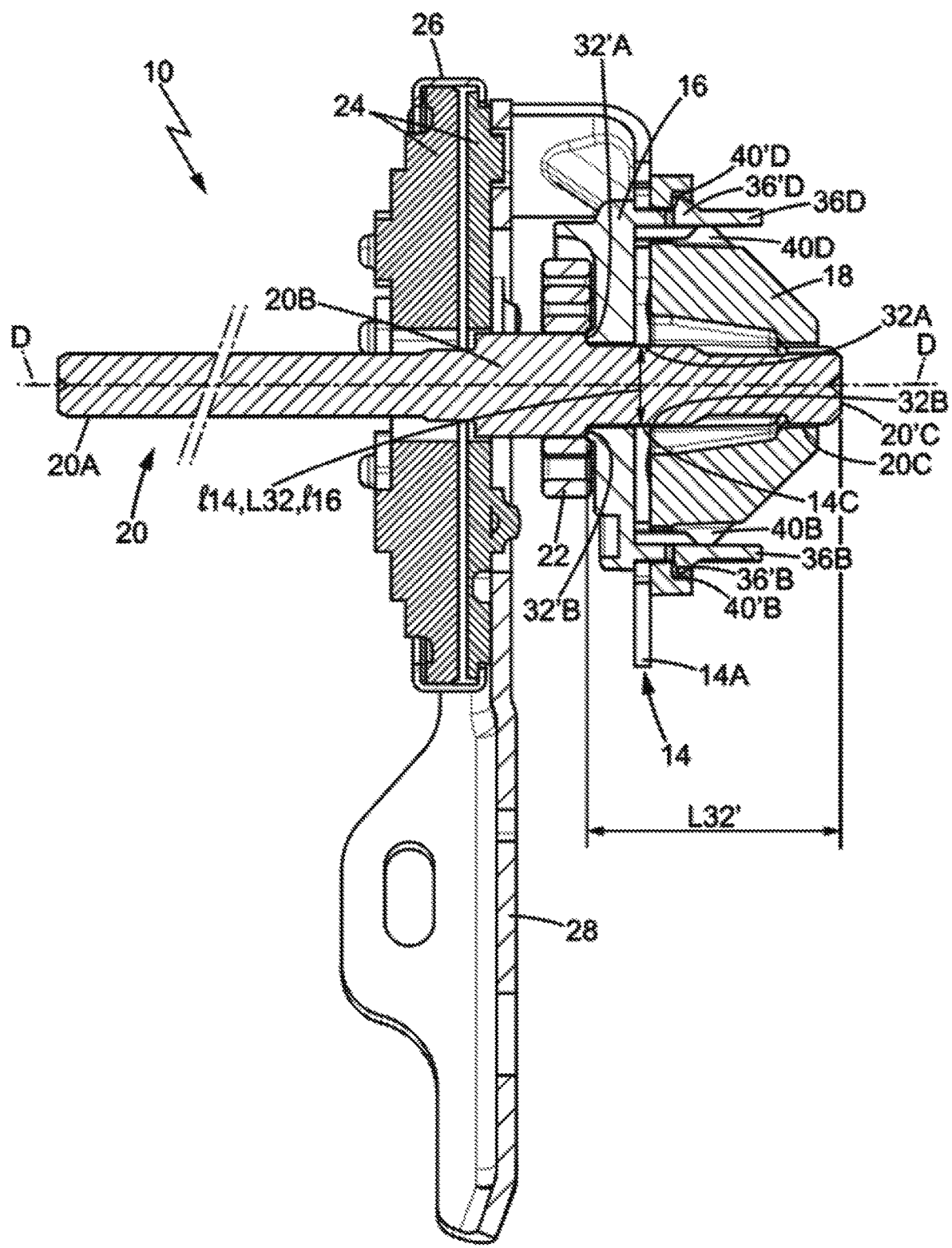
FIG. 4A is a sectional view of FIG. 2 along arrows IVA.
Figure 4B:
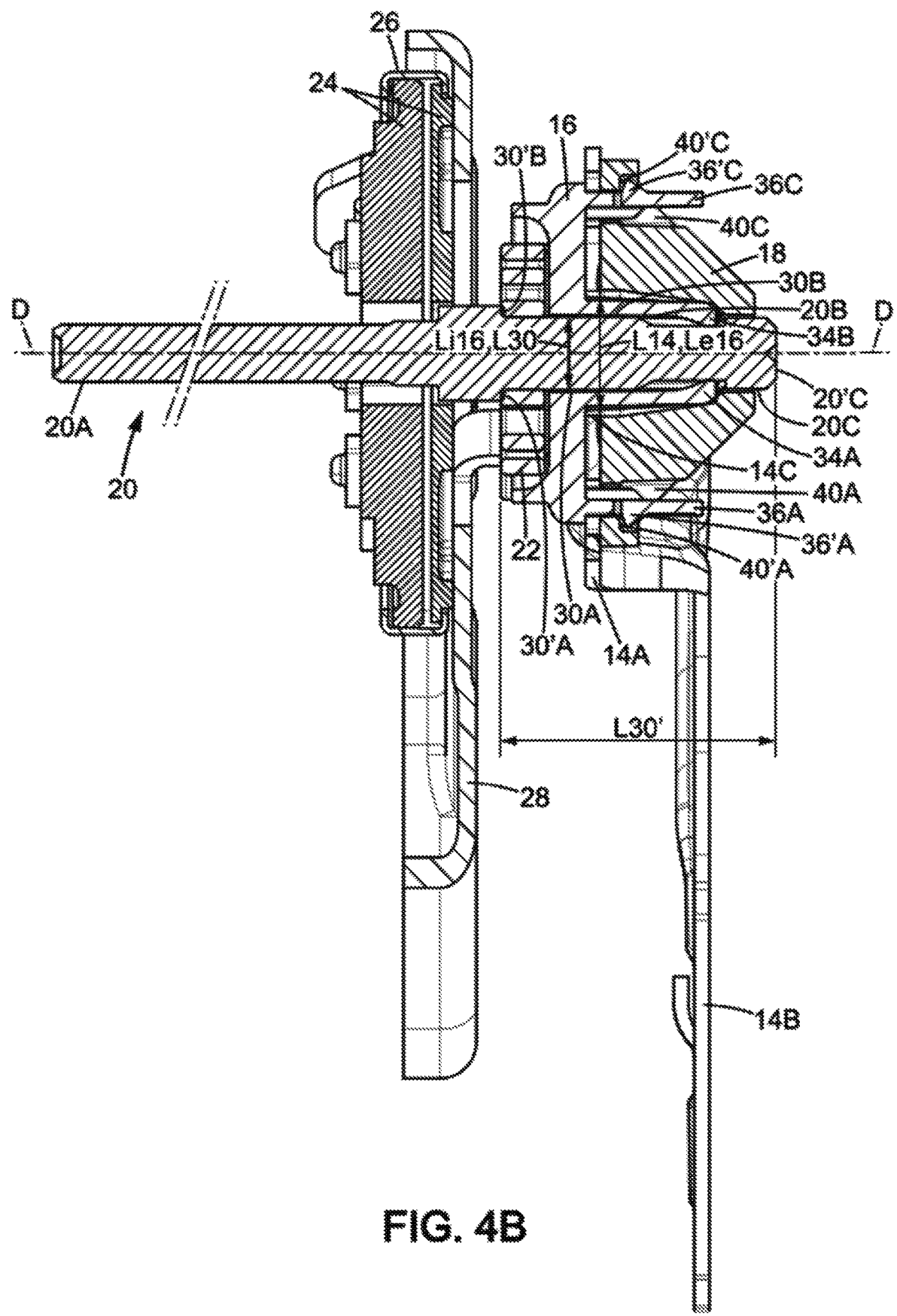
FIG. 4B is a sectional view of FIG. 2 along arrows IVB.

In addition, the backrest hinge 12 comprises a central rod 20, a return spring 22 and an assembly of two discs 24 and a ring 26, and a retaining flange 28 enabling attachment to the seat 1. The central rod 20, the return spring 22, each of the two disks 24, the ring 26, and the retaining flange 28 are circularly mounted on the central rod 20, as best seen in FIGS. 4A and 4B. For this purpose, each of the two discs 24 and the return spring 22 has a central opening 24' and 22' respectively, for the passage of the central rod 20.

Figure 3:
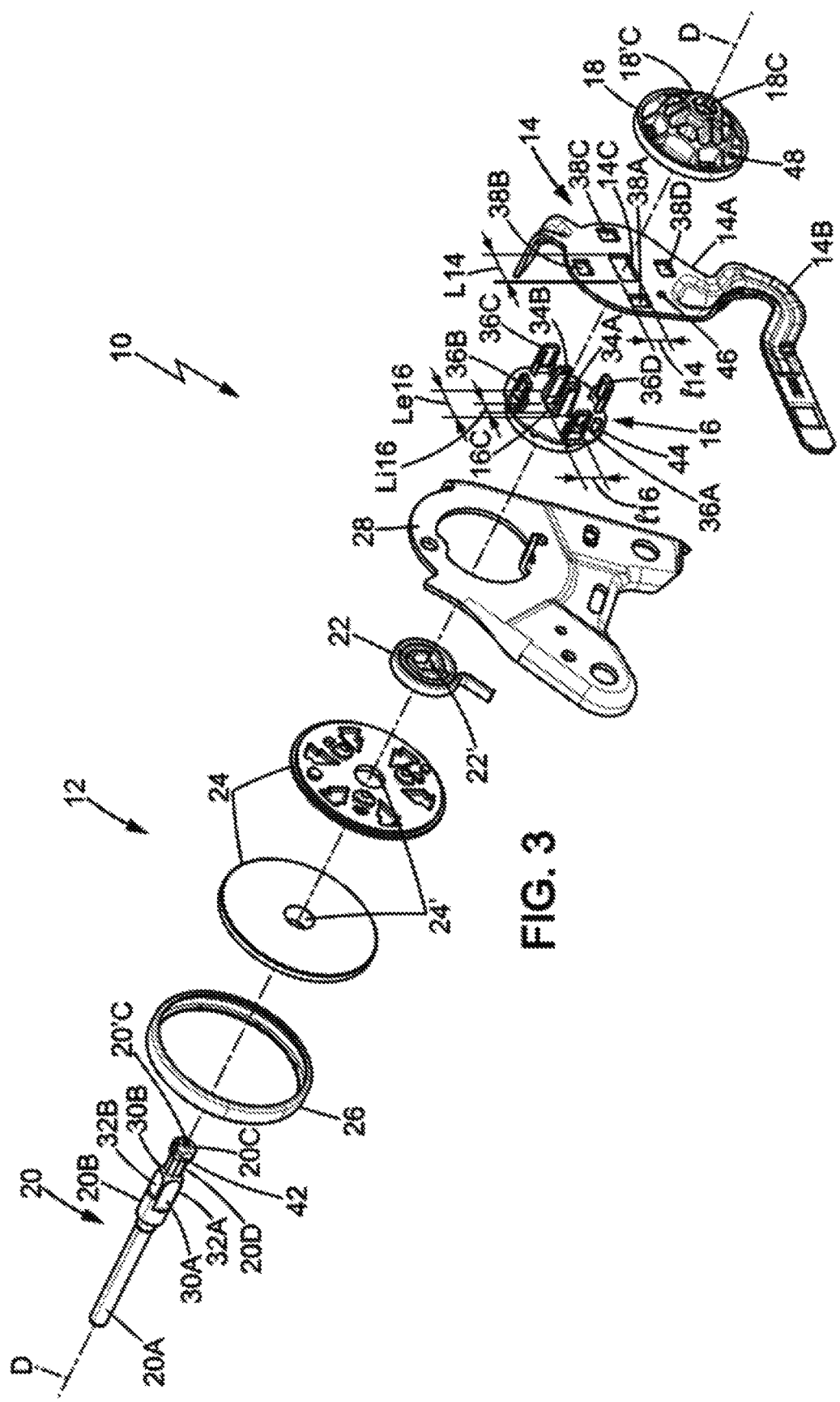
FIG. 3 is an exploded perspective view of the device in FIG. 2.

As best seen in FIG. 3, the central rod 20 has a first right circular cylindrical portion 20A and a second cylindrical portion 20B extending longitudinally along axis D. The central rod 20 further comprises an end portion 20C extending between a narrow portion 20D and a free end portion 20'C. The second cylindrical portion 20B thus extends between the first cylindrical portion 20A and the narrow portion 20D.

The central rod 20 passes through a central opening 14C provided on the handle element 14, a central opening 16C provided on the spacer element 16 and a central opening 18C provided on the lock element 18.

The second cylindrical portion 20B may be provided with two pairs of flat surfaces. In this case, the second cylindrical portion 20B comprises a first pair of flat surfaces having a first flat surface 30A and a second flat surface 30B diametrically opposite the first flat surface 30A, the first and second flat surfaces 30A, 30B extending longitudinally along axis D. Furthermore, the second cylindrical portion 20B comprises a second pair of flat surfaces having a first flat surface 32A and a second flat surface 32B diametrically opposite the first flat surface 32A, the first and second flat surfaces 32A, 32B extending longitudinally along axis D. The first and second flat surfaces 32A, 32B of the second pair of flat surfaces are respectively arranged at least partly between the first and second flat surfaces 30A, 30B of the first pair of flat surfaces, the flat surfaces of the first and second pairs of flat surfaces being of different sizes, so that the cross-section of the central rod 20 is rectangular at the flat surfaces.

The central opening 14C of the handle element 14 that allows the passage of the central rod 20 is preferably rectangular so as to engage with at least a portion of the rectangular section of the central rod 20, more specifically with at least a portion of the second cylindrical portion 20B. The central opening 14C is preferably provided on a central plate 14A from which a handle 14B extends for grasping by a user.

As best seen in FIGS. 3 and 4A, the central opening 14C has a width l14 (measured transversely to axis D) substantially equal to the distance L32 (measured transversely to axis D) between the first and second flat surfaces 32A, 32B. Thus, the central opening 14C engages with the central rod 20.

Furthermore, the central opening 16C of the spacer element 16 is preferably rectangular so as to engage with at least a portion of the rectangular section of the central rod 20. Thus, the central opening 16C has a length and a width l16. The width l16 (measured transversely to axis D) is substantially equal to the distance L32 (measured transversely to axis D) between the two first and second flat surfaces 32A, 32B. Thus, the central opening 14C engages with the central rod 20.

The central opening 16C further comprises the elastic tongues 34A and 34B at the level of its width l16. These elastic tongues thus define an inner length Li16 through which the central rod 20 passes and an outer length Le16 which is intended to pass through the opening 14C of the handle element 14. The inner length Li16 is thus substantially equal to the distance L24 (measured transversely to axis D) between the first and second flat surfaces 32A, 32B.

The central opening 14C of the handle element 14 allows the passage of elastic tongues 34A and 34B provided on the spacer element 16 which are intended, as will be described later, to engage with the lock element 18. In this case, as best seen in FIGS. 3 and 4B, the central opening 14C has a length L14 (measured transversely to axis D) that is substantially equal to the distance between the elastic tongues 34A and 34B; i.e. substantially equal to the outer length Le16 of the spacer element 16 (measured transversely to axis D).

Each of the first and second flat surfaces 30A, 30B of the first pair of flat surfaces defines a respective shoulder 30'A, 30'B. Similarly, each of the first and second flat surfaces 32A, 32B of the second pair of flat surfaces defines a respective shoulder 32'A, 32'B. Altogether, these four shoulders 30'A, 30'B, 32'A and 32'B define stops for the return spring 22, the spacer element 16, the lock element 18 and the handle element 14. In this case, the return spring 22 bears against shoulders 30'A and 30'B of the first pair of flat surfaces as illustrated in FIG. 4B, while the spacer element 16 bears against shoulders 32'A and 32'B of the second pair of flat surfaces as illustrated in FIG. 4A.

Shoulders 30'A, 30'B are each preferably located at a distance L30' from the free end (measured along axis D) as illustrated in FIG. 4B, while shoulders 32'A, 32'B are each preferably located at a distance L32' from the free end (measured along axis D) as illustrated in FIG. 4A. The value of distance L30' is preferably larger than the value of distance L32'; thus, the return spring 22 can be arranged on the central rod 20 to bear against shoulders 30'A, 30'B, then the spacer element 16 is arranged on the central rod 20 and bears against shoulders 32'A and 32'B.

In addition to the elastic tongues 34A and 34B arranged at the width l16 of the central opening 16C of the spacer member 16, the latter may have additional elastic tongues which are also intended to engage with the lock element 18, as will be described later. In this case, as illustrated in FIGS. 3, 4A and 4B, the spacer element 16 may comprise four additional elastic tongues 36A, 36B, 36C and 36D; these additional elastic tongues 36A, 36B, 36C and 36D may be arranged on the periphery of plate 16A in an angular distribution, as can be seen more clearly in FIG. 3. The number of additional elastic tongues may be different, being greater than or less than four.

The handle element 14, in this case the plate 14A, has windows through which the additional elastic tongues 36A, 36B, 36C and 36D pass. Thus, the plate 14A has four windows 38A, 38B, 38C and 38D through which the elastic tongues 36A, 36B, 36C and 36D respectively pass to engage with the lock element 18.

The lock element 18 comprises a central housing 19C intended to engage with the elastic tongues 34A and 34B, and additional housings intended to engage with the additional elastic tongues. In this case, the lock element 18 has four additional housings 40A, 40B, 40C and 40D intended to engage with the additional elastic tongues 36A, 36B, 36C and 36D. In fact, the elastic tongues 36A, 36B, 36C and 36D deform elastically to pass through the lock element 18 and come to be housed in the housings 40A, 40B, 40C and 40D. In order to retain the elastic tongues 36A, 36B, 36C and 36D in the corresponding housings 40A, 40B, 40C and 40D, the latter are each provided with a retaining shoulder 40'A, 40'B, 40'C and 40'D against which a protrusion 36'A, 36'B, 36'C and 36'D provided on the elastic tongues 36A, 36B, 36C and 36D is retained. As best seen in FIG. 4A, the protrusion 36'B, respectively 36'D, bears against the retaining shoulder 40'B, respectively 40'D. As best seen in FIG. 4B, the protrusion 36'A, respectively 36'C, bears against the retaining shoulder 40'A, respectively 40'C.

After snapping these elastic tongues into the housings, the handle element 14 is sandwiched between the spacer element 16 and the lock element 18, holding the assembly securely. Thus, the handle element 14 is held on the seat, in particular on the backrest hinge.

In order to maintain this "handle element 14, spacer element 16 and lock element 18" assembly in position on the central rod 20, the end 20C of the latter is provided with a locking member 42 engaging with the central opening 18C provided on the lock element 18. In this case, as shown in FIGS. 2 and 3, the locking member 42 comprises a plurality of elastic hooks 42 which abut against the outer surface 18'C of the central opening 18C. After insertion into the central opening 18C, the locking member 42 thus allows the "handle element 14, spacer element 16 and lock element 18" assembly to be locked in position on the central rod 20.

As shown in FIG. 3, in order to ensure easy positioning of the elements relative to each other, it may be arranged that the spacer element 16 is provided with an alignment pin 44, and the handle element 14 and lock element 18 each comprise an alignment hole 46, respectively 48 that receives the alignment pin 44.

The handle element 14 comprises a metallic material. In this case, the handle element assembly 14 (plate 14A and handle 14B) is made of metal or alloy. It may be provided that the handle element 14 is made entirely of metallic material; in this case it may be provided that the plate 14A and handle 14B are made entirely of metallic material.

The spacer element 16 comprises a plastic material. Moreover, the lock element 18 comprises a plastic material.

The method for mounting a device for tilting the backrest of a vehicle seat according to the invention is now described. The spacer element 16 is arranged on the central rod 20, then the handle element 14 is arranged on the central rod 20, then the lock element 18 is arranged on the central rod 20.

Prior to mounting the spacer element 16 on the central rod 20, the spring element 22 is arranged on the central rod 20 from the free end 20'C until it abuts against shoulders 30'A and 30'B.

The spacer element 16 is then arranged on the second cylindrical portion 20B of the central rod 20 by fitting it onto the central rod 20 from the free end 20'C until it abuts against shoulders 32'A and 32'B.

The handle element 14 is then arranged on the central rod 20 by fitting it onto the central rod 20 from the free end 20'C and by passing the elastic tongues 34A and 34B through the central opening 14C (forming a window) of the plate 14 of the handle element 14, while the additional elastic tongues 36A, 36B, 36C and 36D pass through the windows 38A, 38B, 38C and 38D of the plate 14 of the handle element 14 until the handle element 14 comes into contact with the spacer element 16.

Then the lock element 18 is arranged on the central rod 20 by fitting it onto the central rod 20 from the free end 20'C and by passing the elastic tongues 34A and 34B through the central housing 19C of the lock element 18 and by passing the additional elastic tongues 36A, 36B, 36C and 36D through the additional housings 40A, 40B, 40C and 40D of the lock element 18. As soon as the tongues pass through the housings they return elastically and are retained by snap-fitting against the retaining shoulders 40'A, 40'B, 40'C and 40'D. Simultaneously, the locking member 42 provided on the central rod 20 is snap-fitted against the outer surface 18'C of the central opening 18C. Thus, the "handle element 14, spacer element 16 and lock element 18" assembly is positioned on the central rod 20 once the spacer element 16 is attached by snap-fitting onto the lock element 18.

The assembly of the various elements of the device 10 and their positioning relative to each other is facilitated by the presence of an alignment pin 44 provided on the spacer element 16. The handle element 14, respectively the lock element 18, each comprises an alignment hole 46, respectively 48, receiving the alignment pin 44 which passes through them.

The invention claimed is:

1. A device for tilting the backrest of a vehicle seat, comprising:
   a backrest hinge;
   a handle element fixed to the backrest hinge, wherein the handle element comprises a metallic material;
   a spacer element located between the backrest hinge and the handle element; and
   a lock element located over the handle element;
   wherein the backrest hinge comprises a central rod, and wherein the central rod passes through a central opening provided respectively on the handle element, on the spacer element and on the lock element.

2. The device according to claim 1, wherein the central rod has an end provided with a locking member engaging with the central opening provided on the lock element.

3. The device according to claim 1, wherein the spacer element is provided with elastic tongues which engage with housings provided in the lock element to hold the handle element on the backrest hinge.

4. The device according to claim 3, wherein the handle element comprises windows through which the elastic tongues pass.

5. The device according to claim 1, wherein the spacer element is provided with an alignment pin and wherein the handle element and the lock element each comprise an alignment hole receiving the alignment pin.

6. The device according to claim 1, wherein the spacer element comprises a plastic material.

7. The device according to claim 1, wherein the lock element comprises a plastic material.

8. The device according to claim 1, wherein the handle element is made entirely of metallic material.

9. The device according to claim 1, wherein the handle element comprises a central plate and a handle that extends from the central plate.

10. The device according to claim 1, wherein the central opening of the handle element is rectangular.

11. A method for mounting the device set forth in claim 1, comprising: arranging the spacer element on the central rod, arranging the handle element on the central rod, and then arranging the lock element on the central rod.

12. A method for mounting the device set forth in claim 1, comprising attaching the spacer element to the lock element by snap-fitting.

13. A device for tilting the backrest of a vehicle seat, comprising:
   a backrest hinge;
   a handle element fixed to the backrest hinge, wherein the handle element comprises a metallic material;
   a spacer element located between the backrest hinge and the handle element; and
   a lock element located over the handle element;
   wherein the spacer element is provided with an alignment pin and wherein the handle element and the lock element each comprise an alignment hole receiving the alignment pin.

* * * * *